Dec. 17, 1963
E. R. MEDRANO
3,114,281
CORK SLAB SLICING MACHINE
Filed Feb. 26, 1962
2 Sheets-Sheet 1
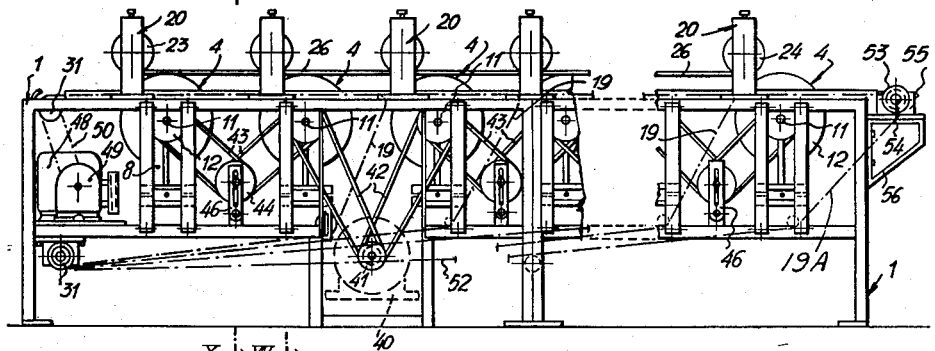
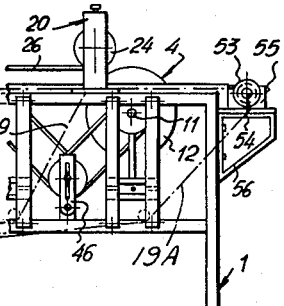
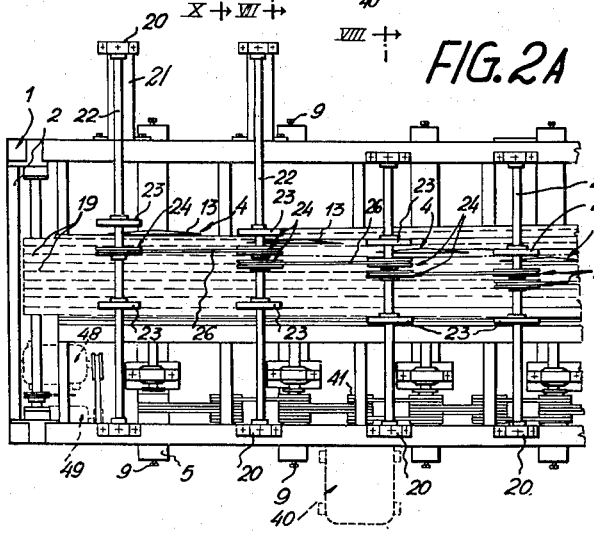
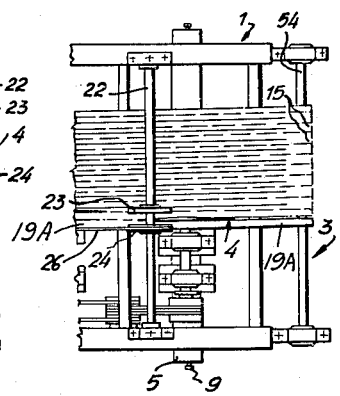
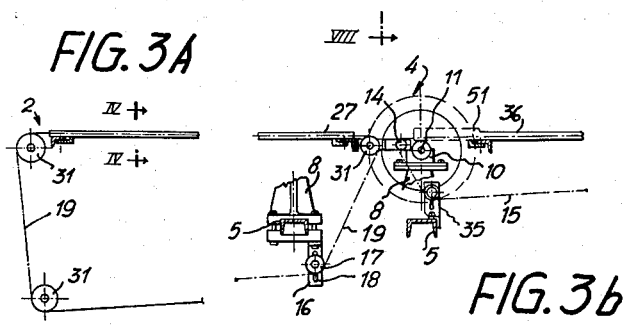
INVENTOR.
Evaristo Rogelio Medrano
BY Tashof & Ashcroff
attorneys Dec. 17, 1963 E. R. MEDRANO 3,114,281
CORK SLAB SLICING MACHINE
Filed Feb. 26, 1962 2 Sheets-Sheet 2

INVENTOR.
Evaristo Rogelio Medrano
BY Tarbuf & Ackeroff,
attorneys

United States Patent Office 3,114,281
Patented Dec. 17, 1963

3,114,281
CORK SLAB SLICING MACHINE
Evaristo R. Medrano, Buenos Aires, Argentina, assignor to Arando Industrial y Comercial Sociedad Anonima, Buenos Aires, Argentina
Filed Feb. 26, 1962, Ser. No. 175,772
14 Claims. (Cl. 83—155)

This invention relates to a cork slab slicing machine wherein a plurality of slices may be achieved using a cork slab or similar material slab, such as conglomerated cork, as starting material with a minimum of power and a maximum of neatness in the cuts. These slices may then be used in a punching machine which does not form part of the present invention to manufacture, for instance, bungs or stoppers.

The cork may be elastic, smooth and uniform in structure, or it may also contain sclereids (hard wall cells) distributed in various patterns and accordingly the machine must be so conceived that it will smoothly operate independently of the nature of the cork. In addition, it is well known that cork is a thick, soft mass, possessing those compressible and elastic properties upon which the economic value of the material chiefly depends, so that a proper cutting is an aim for modern manufacturing processes for bungs, stoppers and the like, for bottles and other vessels containing liquids. Compressibility, elasticity and practical imperviousness to both air and water so fit it for this purpose that the term "cork" is even more applicable to the function than to the substance.

However, for the purpose of this specification, the expression "cork slab" is to be understood as a cork-board of substantial thickness and usually parallelepipedic shape.

The expression "cork" is to be understood as referring to the material as such.

Due to the above cited properties of the cork, machines so far used in cutting cork slices consist simply of a rotary cutting blade partially projecting through a slot of a table having a lateral guide, so that the cork slab is passed along the cutting means to cut off one slice and then the operator has to repeat the same operation by always abutting one edge of the slab and sliding said edge along said lateral guide. The operation as such is somewhat cumbersome and the size of the resulting slices is not very constant, since it depends somewhat on the pressure which is exerted by the operator during the guidance of the cork-slab along the cutting means and since the resulting cork slices are not of uniform size, and are of soft compressible and elastic material, the resulting slices do not always perfectly fit into the feeding mechanism of the punching apparatus for manufacturing the bungs and stoppers.

The present invention has overcome the above mentioned drawbacks and consists in a cork slab slicing machine comprising a frame defining a longitudinal path having an inlet and an outlet; lengthwise staggered in desired slice width, spaced apart, power driven, cutting means; resiliently supported shoe means in the neighborhood of each cutting means overhanging said longitudinal path; first and second series of conveyor means, said first series of conveyor means including cork slab dragging means, the conveyor means of said first series being lengthwise arranged according to said longitudinal path between said inlet and each of said cutting means, and the conveyor means of said second series being lengthwise arranged according to said longitudinal path between said cutting means and said outlet.

Usually, when cork slabs are used they have a maximum width of 40 cm. and a maximum length of 1 m. and the cutting is carried out along the width so as to cut the veins and grains of the slab. If the slab would be cut lengthwise, then the resulting slices, when cut into stoppers, may include stoppers which will not be hermetical, and which should be avoided.

Since the slabs are cut along the width, the cutting means are spaced apart in such a length that preferably the first slice is completely sliced off from the slab before the next slicing is started. Thus, excessive friction is avoided on the cutting means since if several cuts are simultaneously carried out, due to the elasticity of the cork, the friction coefficient on the cutting means would be excessive or in other words, too much power should be required. However, the scope of the present invention is not intended to be limited to those embodiments where only one slice is cut at a time since particularly when conglomerated cork slabs are used a second and even a third cut could be started prior to finishing the first cut.

Thus, it is an object of the present invention to provide a cork slab slicing machine which is able to simultaneously slice such a slab into predetermined uniform width slices.

A further object of the present invention is to provide a cork slab slicing machine where a relatively small force is required to drive the cutting means.

Still a further object is to provide a cork slab slicing machine wherein the cutting means are so staggered, that the start of the cut of each slice is started at an instant different from the start of the other cuts.

Another object is to provide a cork slab slicing machine wherein conveyor means are provided to assure a suitable feeding of the integral cork slab towards the cutting means and further conveyor means are provided to convey the resulting slices away from the cutting means.

These and further objects and advantages of the present invention will become more apparent during the course of the following description, wherein, by way of example, a structural embodiment will be described in relationship to the accompanying drawings, wherein:

FIGS. 1A and 1B, respectively, show side elevations of the inlet and outlet end of the cork slab slicing machine, in accordance with the present invention, it being understood that the intermediate portion of the machine, which is not shown, is simply a repetition of the pertinent portions of the inlet and outlet ends.

FIGS. 2A and 2B are plan views of the portions of the machine, respectively shown in FIGS. 1A and 1B.

FIGS. 3A, 3B and 3C show in schematical side elevation one of the first series and one of the second series of the conveyor means and more particularly the inlet end of the first conveyor means is shown in FIG. 3A, the outlet end of the first conveyor means, its pertinent cutting means, and the inlet end of the second conveyor means are shown in FIG. 3B and the outlet end of the second conveyor means is shown in FIG. 3C.

The cork slab slicing machine according to the present invention, as may be appreciated from FIGS. 1A, 1B, 2A and 2B, comprises a frame 1 which defines a longitudinal path as may be best appreciated from FIGS. 2A and 2B along which a cork slab, usually of parallelepipedic preferably rectangular shape (see FIG. 11), may be passed, to be cut into slices. To this end the frame 1 comprises an inlet 2 and an outlet 3 which likewise represent the inlet and outlet of said longitudinal path.

Figure 7:
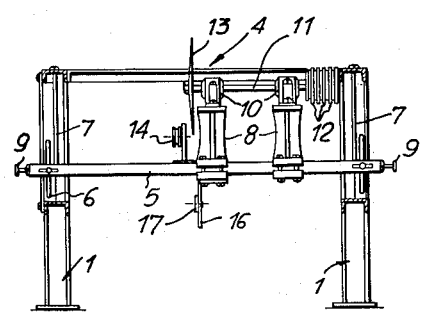
FIG. 7 is a cross-section along line VII—VII of FIG. 1A.

Along said longitudinal path a plurality of cutting means 4 are provided (see also FIG. 7) which are lengthwise staggered in desired slice width spacedapart positions. As may be better appreciated from FIG. 7, each of said cutting means 4 is mounted on a cross bar 5 slidably supported by said frame 1 in view of the pin and slot connection 6 so that by means of the position control screws 7 it is possible to raise and lower said cross bar 5, with regard to the longitudinal path. A pair of posts 8 are slidably mounted along said cross bar 5, to which end the position control screw 9 is provided as will be apparent to those skilled in the art. On the top of the posts 8, a pair of bearings 10 rotatably support a cutter shaft 11 on one end of which a plurality of pulleys 12 is mounted, while the other end supports rotary cutting blade 13.

In view of position control screws 7 and 9 it is possible to vary the position of the cutting blade 13 in both planes so as to adjust said position in accordance with the requirement as to the size of cork slab which is provided and the size of the slices which are desired to be obtained, as will be better understood later on.

The cross bar 5 furthermore supports a tension pulley 14 for a conveyor belt 15 (see also FIGS. 3B and 7) which forms part of the second series of conveyor means, to be described in detail later on.

One of the posts 8, usually the post adjacent the cutter blade 13, hangingly supports by means of a bracket 16 (see FIG. 7), a chain sprocket tension wheel 17 (see also FIG. 3B) which may be adjusted in height due to the pin and slot connection 18. Around the chain sprocket tension wheel 17 a chain 19 moves which defines one of the first series of conveyor means and to which reference will likewise be made later on in detail.

Frame 1 is furthermore provided with a plurality of resiliently supporting bearing supports 20 which in some portions, particularly adjacent the inlet 2 (see FIG. 2A) are in turn on one side arranged on pertinent outwardly projecting brackets 21. Between pairs of bearing supports 20 and across the longitudinal path, roller shafts 22 are arranged above the portion of the longitudinal path through which the cork slab is to be passed.

The outwardly projecting brackets 21 are particularly provided when very long cork slabs are used, in which event the first cutting blade 13 operates as a squaring blade. The remaining portion of the cork slab (on the outer side with regard to FIG. 2A) is then withdrawn from said brackets 21 and represents either waste or an additional slab which may be later on subject to the cutting process.

Figure 8:
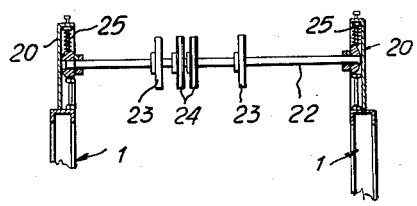
FIG. 8 is a cross-section along line VIII—VIII of FIG. 2A, the portion of the electric motor which should be visible in FIG. 8 has however been omitted.

As may be better appreciated in FIG. 8 almost each roller shaft 22 supports a pair of outer antivibrating, guiding and downwardly pressing rollers 23 and a pair of skate supporting idlers 24. Roller shaft 22 is resiliently supported by the bearing supports 20 which include to this effect compression springs 25. It may thus be stated that the assembly as described in connection with FIG. 8, or each of said assemblies, are overhanging said longitudinal path.

Figure 9:
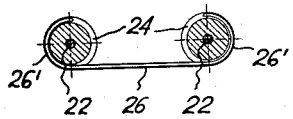
FIG. 9 is a side elevation of a pair of shoe means including a skate.

As may be best seen in FIG. 9, between a pair of adjacent skate supporting idlers 24, obviously each mounted on a roller shaft 22 and which shafts are adjacent shafts, as will be obvious by analyzing for instance FIG. 2A, a skate 26 is arranged. The skate simply consists of a flat plate slide member having a pair of hook-shaped end portions 26'. Since idlers 24 are sheaves, the skates 26 are held within the pertinent grooves as far as the hook-shaped end portions 26' are concerned, so that the idlers 24 are free to rotate relative to the shafts 22. The skate 26, and more particularly the flat plate portion thereof, will define a tunnel with the pertinent first conveyor means in form of a chain 19, so that a portion of the slab is prevented from vibration in the vertical plane, said portion being adjacent one of the rotary cutting blades 13 (see FIG. 2A), as will be later better understood.

The assembly of the rollers 23, idlers 24 and skates 26 will likewise be called "shoe means."

Returning now to the conveyor means and more particularly to FIGS. 3A, 3B, 3C, 4, 5 and 6, it will be appreciated that for each cutting means 4 there is a first conveyor consisting of the previously referred to chain 19 arranged between the inlet 2 and the cutting zone of the cutting means 4 and more particularly of the rotary cutting blade 13 and there is a second conveyor means defined by the previously referred to conveyor belt 15 arranged behind the cutting zone but within the range of the cutting blade and the outlet 3. The chain 19 and more particularly the series of chains 19 defining the longitudinal path with regard to the inlet are destinated to convey the uncut cork slab portion 32 (see FIG. 11) towards the cutting stations, while the conveyor belts 15 are destinated to move the cut slices 37 from the cutting zone away towards the outlet 3 (FIG. 2B).

Since the cutting means 4 are arranged in staggered relationship, obviously the length of the pertinent chains 19 and conveyors 15 vary accordingly.

Figure 4:
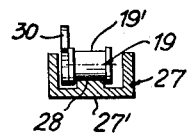
FIG. 4 is a cross-section along line IV—IV of FIG. 3A.
Figure 5:
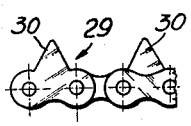
FIG. 5 is a side elevation of a portion of the first conveyor means including the dragging means.
Figure 6:
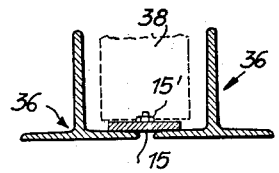
FIG. 6 is a cross section along line VI—VI of FIG. 3C.

The chain 19 or better said all the chains 19 must be provided with dragging means 29 so as to push the uncut cork slab portion 32 (see FIG. 11) forward towards the respective cutting zones and to this effect each chain 19, as may be best appreciated in FIG. 4, as far as its upper path is concerned, is guided in a U-shaped channel member 27 having in its base portion 27' an upwardly projecting race 28 along which the roller portions 19' slide. One side of the chain 19, as may be better appreciated in FIG. 5, supports the dragging means 29 in the shape of prongs 30 which project out of the U-shaped channel member 27 and thus are able to penetrate into the lower face 33 (FIG. 11) of the uncut cork slab portion 32 and drag said slab towards the cutting zone. Obviously, each chain 19 is an endless chain and to this effect passes over suitable sprockets 31 besides of the previously mentioned chain sprocket tension wheel 17 (see FIGS. 3A and 3B).

Figure 11:
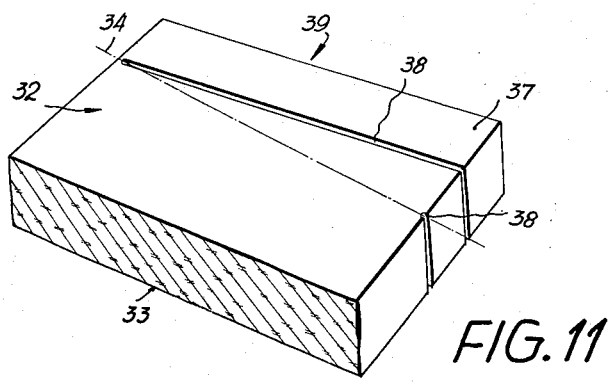
FIG. 11 is a perspective view of a cork slab which has been partially sliced and may be supposed as having been withdrawn from the inlet end of the machine, so as to better illustrate the inventive concept.

With regard to the second series of conveyor means, and more particularly to each conveyor belt 15, these are arranged behind the cutting zone which in FIG. 11 is identified by the dash and dotted line 34. The conveyor belt 15 besides passing around the previously mentioned tension pulley 14, further passes around additional pulleys 35 (FIGS. 3B and 3C) and, as far as the upper portion is concerned, is guided between pairs of T-shaped beams 36 (see FIG. 6). As may be appreciated from FIG. 3B, the front end of each of the T-shaped beams 36 has a larger height portion 51, since each strip when being sliced at the beginning of the cut has a tendency to rise and therefore the beginning of the channelled portion requires a pertinent height. It is furthermore advisable to provide each belt 15 with small stops 15' to prevent the slices which have been cut and which are relatively short from sliding back on the pertinent belt.

As may be best seen by comparing FIGS. 2A and 2B, the chains 19 are parallel to each other and belts 15 are parallel to each other but the series of the chains 19 are not parallel to the series of the belt 15, the latter slightly angling away from said chains 19 inasmuch as each cutting blade 13 will, due to its one conical shape, slightly split away each of the slices 37 (see FIG. 11) thereby decreasing the friction effect on the cutting blades 13 and defining between them the channels 38, which accounts for the different orientation of the second series of conveyors, i.e. the belts 15 with regard to the first series of conveyors, i.e. the chains 19. Thus, the assembly of slices 37, as shown in FIG. 11, may be considered as the sliced cork slab portion 39. Actually, as may be appreciated from FIG. 11, the first slice 37 is entirely or almost entirely cut from the uncut cork slab portion 32 prior to starting the second cut, which in FIG. 11 is shown as just having been started and will define a future second channel 38.

As best shown in FIG. 1A, the machine may have one or several driving sources, such as the electric motor 40. The driving pulley 41 provided with at least two grooves so that each of a pair of belts 42 may drive one of the adjacent pulleys 12 of the cutter shafts 11 which in turn by means of transmission belts 43 and intermediate pulleys 44 enable to transmit the driving force to a plurality of cutting blades 13.

Figure 10:
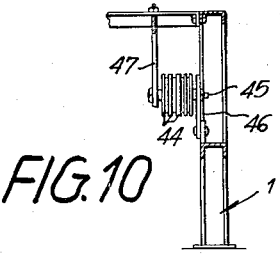
FIG. 10 is a cross-section along line X—X of FIG. 1A, but only showing a portion thereof.

As to the intermediate pulleys 44, reference is more specifically made to FIG. 10, wherefrom it may be appreciated that each of said intermeditae pulleys 44 are supported on a shaft 45 in turn supported by a slotted bracket 46 and a height graduating screw 47.

The series of conveyor means 15, 19 are driven by independent driving means, such as electric motor 48, having a gear box 49 and driving through chain 50 sprocket 31, whereby all the chains 19 are driven. The chain 19 of the last conveyor which is identified by reference numeral 19A, in FIGS. 13 and 2B, does not only reach to the last cutting blade, but actually projects onto and over shaft 54, to which end said shaft is provided with a sprocket 53 (see FIG. 1B). Thus, in this case, chain 19A, operates as a conveyor of the first series and a conveyor of the second series and furthermore as a driving means for driving shaft 54, on which the remaining pulleys 35 are mounted which drive the belts 15. Shaft 54 is mounted by its end portions in bearings 55 (see FIG. 1B) supported by brackets 56.

As to the operation of the cork slab slicing machine of the present invention, in view of the foregoing it will already be apparent to those skilled in the art, that when the uncut cork slab is inserted into the feeding end or more particularly on top of the inlet 2 and the pertinent series of chains 19, the prongs 30 (FIG. 5) will enter the lower face 33 (FIG. 11) of the cork slab portion 32 and move the slab forward until said slab meets the first antivibrating, guiding and downwardly pressing roller 23 and also the first inner skate supporting idler 24. As may be seen in FIG. 2A, on this first roller shaft 22 there is only a single idler 24 which will, together with the skate 26, maintain the cork portion adjacent the first cutting means 4 in proper position to avoid vibrations in the vertical plane and as well as a sidewise movement, so that the rotary cutting blade 13 will start to cut the first slice 37, thus defining the first channel 38, which would be the longest channel in FIG. 11.

As the slab continues its movement towards the outlet 3, gradually the uncut cork slab portion 32 adjacent the previously mentioned channel 38 will be properly retained by the first skate 26 so that when the second channel 38 is started to be cut by the second cutting blade 13, the cutting will be performed without any vibration and thus the second slice will start to be formed, preferably when the cutting action of the first slice has been concluded and when the first slice has thus already entered the pertinent channel formed by a pair of T-shaped beams 36. To avoid, as already stated, excessive friction on the cutting means, each of the channels is angularly spaced apart from the first series of conveyor means 19, as may be appreciated in FIG. 2B.

From the foregoing it will be apparent that the slab is gradually sliced according to a sloped line 34, previously defined as cutting zone (see FIG. 11), so that even if the cork contains sclereids, these will not harm the clean cutting, since the cuts are started one by one due to the staggered arrangement of the cutting blades 13, as previously described at the same time the skates 26 always assure that near each cutting zone the pertinent portion of the cork slab is properly retained.

Obviously, a number of modifications as to the structural embodiments may be suggested as will be apparent to those skilled in the art, such as instead of using the intermediate pulleys 44 and belts 42 and 43, chains or other driving means may be provided.

I claim:

1. A cork slab slicing machine for cutting strips from a slab of cork by cutting the slab transversely of its plane, comprising a frame defining a longitudinal path having an inlet and an outlet, lengthwise staggered in desired slice width, laterally spaced apart power driven cutting means for cutting said slab transversely of its plane, resiliently supported shoe means in the neighbourhood of each cutting means overhanging said longitudinal path, first and second series of laterally spaced apart, lengthwise staggered conveyor means, said shoe means and said conveyor means confining therebetween the slab during cutting, means for driving said conveyor means, said first series of conveyor means including cork slab dragging means for delivering the slab to the cutting means, individual conveyor means of said first series extending along said longitudinal path from said inlet to adjacent the entrance edge of each of said cutting means, and each conveyor means of said second series removing the cut strips from said cutting means and extending along said longitudinal path from adjacent the exit edge of one of said cutting means to said outlet.

2. A cork slab slicing machine for cutting strips from a slab of cork by cutting the slab transversely of its plane, comprising a frame defining a longitudinal path having an inlet and an outlet, lengthwise staggered in desired slice width, laterally spaced apart power driven cutting means for cutting said slab transversely of its plane, said cutting means each including a rotary cutting blade projecting from beneath and into said longitudinal path, resiliently supporting shoe means in the neighbourhood of each cutting means overhanging said longitudinal path, first and second series of laterally spaced apart, lengthwise staggered conveyor means, said shoe means and said conveyor means defining therebetween the slab during cutting, means for driving said conveyor means, said first series of conveyor means including cork slab dragging means for delivering the slab to the cutting means, individual conveyor means of said first series extending along said longitudinal path from said inlet to adjacent the entrance edge of each of said cutting means, and each conveyor means of said second series removing the cut strips from said cutting means and extending along said longitudinal path from adjacent the exit edge of one of said cutting means to said outlet.

3. A cork slab slicing machine as claimed in claim 2, wherein said frame includes for each cutting means a cross bar having means for varying the height with regard to said longitudinal path, at least one post slidably mounted on said cross bar and rotatably supporting said cutting blade.

4. A cork slab slicing machine as claimed in claim 3, wherein said cutting blade is mounted on a cutter shaft, said shaft further supporting transmission means in operative relationship with a driving source.

5. A cork slab slicing machine as claimed in claim 4, wherein said transmission means comprises at least one pulley, a belt for said pulley and said belt being in operative relationship with said driving source.

6. A cork slab slicing machine as claimed in claim 5, wherein said frame further supports intermediate pulleys between said pulleys of said cutter shafts and transmission belts connecting said pulleys and said intermediate pulleys in train form, and an electric motor defining said driving source.

7. A cork slab slicing machine for cutting strips from a slab of cork by cutting the slab transversely of its plane, comprising a frame defining a longitudinal path having an inlet and an outlet, lengthwise staggered in desired slice width, laterally spaced apart power driven cutting means, for cutting said slab transversely of its plane, first and second series of laterally spaced apart, lengthwise staggered conveyor means, resiliently supported shoe means in the neighbourhood of each cutting means, said resiliently supported shoe means comprising spaced apart roller shafts supported cross-wise said longitudinal path and overhanging said longitudinal path, said roller shafts each being resiliently supported by said frame, at least one antivibrating, guiding and downwardly pressing roller and one skate supporting idler sheave on each of said shafts adjacent said cutting means, skate members each including a pair of hook-shaped end portions and an intermediate plate portion, said hook-shaped end portions being mounted on adjacent, spaced apart sheaves whereby each of said intermediate plate portions defines with said first conveyor means a tunnel portion through which said cork slab is adapted to pass, means for driving said conveyor means, said first series of conveyor means including cork slab dragging means for delivering the slab to the cutting means, individual conveyor means of said first series extending along said longitudinal path from said inlet to adjacent the entrance edge of each of said cutting means, and each conveyor means of said second series removing the cut strips from said cutting means and extending along said longitudinal path from adjacent the exit edge of one of said cutting means to said outlet.

8. A cork slab slicing machine as claimed in claim 7, wherein some of said roller shafts support a pair of outer antivibrating guiding and downwardly pressing rollers and a pair of inner skate supporting idler sheaves.

9. A cork slab slicing machine for cutting strips from a slab of cork having a lower face by cutting the slab transversely of its plane, said machine comprising a frame defining a longitudinal path having an inlet and an outlet, lengthwise staggered in desired slice width, laterally spaced apart power driven cutting means for cutting said slab transversely of its plane, resiliently supported shoe means in the neighbourhood of each cutting means overhanging said longitudinal path, first and second series of laterally spaced apart, lengthwise staggered conveyor means, said shoe means and said conveyor means confining therebetween the slab during cutting, means for driving said conveyor means, sprocket means, said first series of conveyor means comprising a plurality of parallel endless chains on said sprocket means, each chain defining a horizontal upper path forming part of said longitudinal path, channel members for the horizontal upper paths through which said chains pass, and a plurality of prongs connected to each of said chains and projecting out of said channel members adapted to enter for dragging purposes the lower face of said cork slab for delivering the slab to the cutting means, individual conveyor means of said first series extending along said longitudinal path from said inlet to adjacent the entrance edge of each of said cutting means, and each conveyor means of said second series removing the cut strips from said cutting means and extending along said longitudinal path from adjacent the exit edge of one of said cutting means to said outlet.

10. A cork slab slicing machine as claimed in claim 9, wherein said chains have roller portions, each of said channel members is a U-shaped member having a base portion including an upwardly projecting race adapted to guide the roller portions of said chains, each of said channel members being arranged between said inlet and its pertinent cutting means.

11. A cork slab slicing machine for cutting strips from a slab of cork by cutting the slab transversely of its plane, comprising a frame defining a longitudinal path having an inlet and an outlet, lengthwise staggered in desired slice width, laterally spaced apart power driven cutting means for cutting said slab transversely of its plane, resiliently supported shoe means in the neighbourhood of each cutting means overhanging said longitudinal path, first and second series of laterally spaced apart, lengthwise staggered conveyor means, said shoe means and said conveyor means confining therebetween the slab during cutting, means for driving said conveyor means, said first series of conveyor means including a cork slab dragging means for delivering the slab to the cutting means, individual conveyor means of said first series extending along said longitudinal path from said inlet to adjacent the entrance edge of each of said cutting means, and each conveyor means of said second series removing the cut strips from said cutting means and extending along said longitudinal path from adjacent the exit edge of one of said cutting means to said outlet, said second series of conveyor means comprises a plurality of parallel endless belts each including an upper portion defining part of said longitudinal path, each of said belts being mounted on pulleys, said upper portions being housed in parallel T-shaped beams defining in between pairs of channels through which said belts are capable of passing.

12. A cork slab slicing machine for cutting strips from a slab of cork by cutting the slab transversely of its plane, comprising a frame defining a longitudinal path having an inlet and an outlet, lengthwise staggered in desired slice width, laterally spaced apart power driven cutting means for cutting said slab transversely of its plane, resiliently supported shoe means in the neighbourhood of each cutting means overhanging said longitudinal path, first and second series of laterally spaced apart lengthwise staggered conveyor means, said shoe means and said conveyor means confining therebetween the slab during cutting, means for driving said conveyor means, sprocket means, said first series of conveyor means comprising a plurality of parallelly arranged endless chains on said sprocket means, each chain defining a horizontal upper path forming part of said longitudinal path, channel members for the horizontal upper paths through which said chains pass, and a plurality of prongs connected to each of said chains and projecting out of said channel members adapted to enter for dragging purposes the lower face of said cork slab for delivering the slab to the cutting means, individual conveyor means of said first series extending along said longitudinal path from said inlet to adjacent the entrance edge of each of said cutting means, and each conveyor means of said second series removing the cut strips from said cutting means and extending along said longitudinal path from adjacent the exit edge of one of said cutting means to said outlet, said second series of conveyor means comprises a plurality of parallel endless belts each including a portion defining part of said longitudinal path, each of said belts being mounted on pulleys, said upper portions being housed in parallel T-shaped beams defining in between pairs of channels through which said belts are capable of passing.

13. A cork slab slicing machine as claimed in claim 12, wherein said plurality of chains are parallel amongst themselves and said plurality of belts are parallel amongst themselves, said plurality of belts are arranged at a slight angle with regard to said plurality of chains.

14. A cork slab slicing machine as claimed in claim 12, wherein independent driving means are provided for said cutting means and said series of conveyor means.

References Cited in the file of this patent

UNITED STATES PATENTS

| | | |
|---|---|---|
| 1,111,170 | Nall | Sept. 22, 1914 |
| 1,258,222 | Jacobs et al. | Mar. 5, 1918 |
| 1,383,133 | Lucke | June 28, 1921 |
| 1,397,198 | Alchin | Nov. 15, 1921 |
| 1,419,144 | Kent | June 13, 1922 |
| 1,493,010 | Winkley | May 6, 1924 |
| 1,668,819 | Parsons | May 8, 1928 |
| 1,787,458 | Swenson | Jan. 6, 1931 |
| 2,454,316 | Haecks | Nov. 23, 1948 |
| 2,615,555 | Carter | Oct. 28, 1952 |
| 2,941,560 | McCaffery | June 21, 1960 |
| 2,979,979 | Hearden | Apr. 18, 1961 |

FOREIGN PATENTS

| | | |
|---|---|---|
| 611,886 | France | July 19, 1926 |